(12) United States Patent
Yamada

(10) Patent No.: US 6,644,242 B2
(45) Date of Patent: Nov. 11, 2003

(54) AQUATIC ANIMAL INCUBATION DEVICE

(75) Inventor: Hiroshi Yamada, Nagano (JP)

(73) Assignees: Guppy Co., Ltd. (JP); Japan Pet Drags Co., Ltd. (JP)

(*) Notice: Subject to any disclaimer, the term of this patent is extended or adjusted under 35 U.S.C. 154(b) by 0 days.

(21) Appl. No.: 10/129,769

(22) PCT Filed: Jul. 6, 2001

(86) PCT No.: PCT/JP01/05922

§ 371 (c)(1),
(2), (4) Date: May 8, 2002

(87) PCT Pub. No.: WO03/003822

PCT Pub. Date: Jan. 16, 2003

(65) Prior Publication Data

US 2003/0106499 A1 Jun. 12, 2003

(51) Int. Cl.[7] .............................................. A01K 61/00
(52) U.S. Cl. ........................................ 119/206; 119/205
(58) Field of Search ................... 119/204, 205, 119/206, 211, 213, 217, 218

(56) References Cited

U.S. PATENT DOCUMENTS

| 3,086,497 A | * | 4/1963 | Novello ...................... 119/206 |
| 3,540,414 A | * | 11/1970 | Maloney, Jr. ............... 119/206 |
| 3,604,395 A | * | 9/1971 | Huslin ........................ 119/205 |
| 3,678,899 A | * | 7/1972 | Lovitz ........................ 119/206 |
| 3,685,489 A | * | 8/1972 | Day et al. .................... 119/206 |
| 3,738,316 A | * | 6/1973 | Stasio ......................... 119/206 |

FOREIGN PATENT DOCUMENTS

| JP | 10-029115 | 1/1998 |
| JP | 11-079056 | 3/1999 |
| JP | 11-098980 | 4/1999 |

* cited by examiner

*Primary Examiner*—Charles T. Jordan
*Assistant Examiner*—Elizabeth Shaw
(74) *Attorney, Agent, or Firm*—Cook,Alex,McFarron, Manzo,Cummings & Mehler, Ltd.

(57) ABSTRACT

Incubation device (10) has a structure wherein an incubation tank (11) and a separation tank (12) are put into communication with each other at the lowermost parts via a narrow communicating port (13). A side opening (14) is formed in the separation tank (12). The wall of the lower part of an upper housing part (12*a*) and of the entirety of a lower housing part (12*b*) of the separation tank (12) are formed from a colored, light-shielding material OP. Sea water (D) is housed in incubation tank (11) and the lower part of separation tank (12), freshwater (E) is housed in the upper part of the separation tank (12), and an interface (F) between the sea water (D) and the freshwater (E) is formed inside the separation tank (12). Brine shrimp larvae (2) hatch in the incubation tank (11) and upon moving into the separation tank (12), move from the light-shielded lower part towards the unshielded upper part and eventually swim outside into an aquarium tank from the side opening (14).

24 Claims, 9 Drawing Sheets

AQUATIC ANIMAL INCUBATION DEVICE

FIELD OF THE ART

This invention relates to an aquatic animal incubation device and in particular, relates to a container structure that is favorable for use as an incubation container for brine shrimp.

BACKGROUND ART

Brine shrimp (Artemia) is an aquatic animal (a kind of shrimp) that has the characteristic of hatching in sea water and its eggs can be preserved in the condition of dried eggs over a long period of time. Brine shrimp larvae that have been hatched from the eggs are thus generally used as feed for aquarium fish and other aquatic animals.

Brine shrimp eggs hatch readily upon being placed in sea water and stirred continuously. In a general hatching method, saltwater (seawater or artificial seawater, etc.) is prepared in a container, brine shrimp eggs are placed in this container, an air tube is set inside this container, and air is blown in so that bubbles will rise through the salt water and the salt water will be stirred by the rising bubbles. Brine shrimp larvae hatch from the eggs in about one day.

The hatched brine shrimp larvae are scooped from inside the container using a net, etc. and are given as feed to aquarium fish, etc. in an aquarium tank. In this case, since numerous egg shells and non-hatched eggs that remain after hatching exist in the container and since the egg shells and unhatched eggs decompose with time, the water quality of the salt water in the container degrades. In addition, since egg shells and non-hatched eggs are introduced along with the larvae into the aquarium tank in the feeding process, there is also the problem that such egg shells and unhatched eggs decompose, causing degradation of water quality inside the aquarium tank.

DISCLOSURE OF THE INVENTION

In order to solve the above problem, the present inventor has invented an incubation device, with which the hatched aquatic animals can be induced to move away on their own from the egg shells and unhatched eggs, or an incubation device, with which the hatched aquatic animals can be induced to move on their own from inside the container to inside the aquarium tank.

This incubation device is comprised of an incubation tank for the hatching of aquatic animals and a separation tank for separating the hatched aquatic animals. The abovementioned incubation tank and separation tank are put into communication with each other via a communicating port. At a region at the communicating port side of the separation tank is provided a light-shielding wall part that is provided with a higher light-shielding property than other parts of the abovementioned separation tank.

Since the vicinity of the communicating port is made dark and the side away from the communicating port is made brighter by the provision of light-shielding property at, the communicating port side of the separation tank, larvae that have moved from the incubation tank into the separation tank move away on their own from the communicating port in the separation tank. Since eggshells and unhatched eggs are thus separated from larvae in the separation tank, just the larvae can be taken out readily.

The abovementioned separation tank may be provided with a side opening. By placing an incubation device provided with this side opening in water, the larvae that have been separated inside the separation tank can be made to swim out into the water outside the incubation device via the side opening. In this case, it is preferable for the abovementioned light-shielding wall part to be arranged so as not to shield light in the vicinity of the abovementioned side opening or so that the degree of light shielding will be lower in the vicinity of the abovementioned side opening than in the region that is covered by the abovementioned light-shielding wall part. In particular, when a part exists above the abovementioned side opening of the above-described separation tank, a light-shielding wall part is preferably provided at this part as well.

When such a side opening is provided, the shape of the separation tank is preferably arranged so that the entirety is inclined upwards towards the side opening side. It is especially preferable for the lower part of the separation tank to be inclined upwards towards the side opening side. By such an arrangement, eggshells that have entered inside the separation tank can be prevented from moving to the exterior from the side opening.

Examples of the modes of providing the abovementioned light-shielding property include a structure with which a part of the wall of the abovementioned separation tank is colored to shield a part of the external light, a structure with which a part of the wall of the abovementioned separation tank is thickened to shield a part of the external light, a structure with which a part of the wall of the abovementioned separation tank is colored and thickened, a structure with which a light-shielding layer is formed on the wall of the abovementioned separation tank, etc. It is also preferable to increase the light-shielding property by roughening the surface of the wall.

The abovementioned light-shielding wall part is preferably arranged to extend over a wider range in the direction away from the abovementioned communicating port at the side opposite the abovementioned side opening than at the side of the abovementioned side opening.

The above-described separation tank preferably has an enlarged part that gradually increases in cross-sectional area with the distance away from the abovementioned communicating port. Due to this enlarged part, even when water current flows into the enlarged part of the separation tank from the incubation tank, the water current will be attenuated and the stillness of the interior of the separation tank will-be maintained by the gradual increase of cross-sectional area from the communicating port onwards. By this arrangement, in the case where salt water is placed in the entirety of the incubation tank and the lower part of the separation tank, freshwater is placed in the upper part of the separation tank, and an interface is formed between the salt water and freshwater in the separation tank, the stillness of the interface can be maintained and the salt water and freshwater can be prevented from becoming mixed readily.

The abovementioned light-shielding wall part is preferably arranged so as to cover the entirety of the abovementioned-enlarged part and to extend beyond the outer edge of the abovementioned enlarged part in the direction away from the abovementioned communicating port. By arranging the wall region provided with light-shielding property to extend beyond the enlarged part, it becomes possible to readily induce the larvae to move across and beyond the outer edge of the enlarged part. Normally in the case where a light-shielding wall part is not provided, the larvae that have moved into the separation tank tend to stay at the salt water side of the interface between salt water and freshwater. Thus by arranging the abovementioned light-shielding wall part to extend beyond the outer edge of the enlarged part, it becomes possible to prevent the staying of larvae at the salt water side of the interface even when the abovementioned interface is set above the enlarged part.

The abovementioned communicating port is preferably provided at the lowermost parts of the above-described incubation tank and the above-described separation tank. When the communicating port is provided at the lowermost parts of the incubation tank and separation tank, the unhatched eggs that have become mingled inside the separation tank via the communicating port can be made to sediment by gravity and thereby returned to the vicinity of the communicating port. The amount of unhatched eggs that stay in the separation tank can thereby be reduced.

The above-described separation tank preferably has an inner bottom surface that inclines gradually upwards from the abovementioned communicating port. Unhatched eggs that have become mingled inside the separation tank can readily be made to drop towards communicating port along this inclined inner bottom surface and thereby returned to the incubation tank to further reduce the amount of unhatched eggs that stay in the separation tank.

The above-described light shielding wall part is preferably arranged to cover the entirety of the part with the above-described inclined inner bottom surface and to extend upwards beyond the upper edge of this part. Larvae and unhatched eggs can thus be separated more efficiently.

An upper opening is preferably provided at the upper part of the above-described separation tank. By there being provided an upper opening, the larvae that have moved into the separation tank can be induced to move by means of external light that is made incident from the upper opening, thus enabling separation from unhatched eggs, etc. and also enabling just the larvae to be taken out from the upper opening.

The abovementioned upper opening of the separation tank is preferably arranged so that a light-shielding lid can be attached. By attachment of a light-shielding lid to the upper opening, the external light that is made to enter into the separation tank can be restricted further, making it easier to induce larvae to move towards a side opening in the case where a side opening is provided, or, even in the case where a side opening is not provided, towards a wail without a light-shielding property or with a low light-shielding property. It is also preferable that a light-shielding wall part be provided in the part extending from the side opening to the upper opening of the separation tank.

An upper opening is preferably provided at the upper part of the above-described incubation tank. Eggs can then be loaded from the upper opening and eggshells can also be removed through the upper opening. Here, a water current restraining plate, which restrains water current from flowing in and out of the vicinity of the abovementioned upper opening inside the above-described incubation tank, is preferably inserted in the upper opening.

The wall of the incubation tank preferably has a light-transmitting property. By the wall of the incubation tank having a light-transmitting property, the stirring conditions of the eggs, the hatching conditions, the conditions of the eggshells and unhatched eggs, etc. can be checked readily.

The above-described hatching tank is preferably provided with a stirring means that stirs the water in the interior of the hatching tank. A stirrer that directly stirs the water inside the hatching tank (a stirrer, for example, which is provided with a rotation driving source, such as an electric motor or rotating magnetic field generating means, etc., and is driven to rotate by such a rotation driving source) can be given as an example of a stirring means.

The application of aeration to the interior of the above-described incubation tank to cause a water flow by means of bubbles can also be given as an example of the abovementioned stirring means. In this case, it is most preferable to provide just an aeration gas inlet at a lower part of the above-described incubation tank without providing the stirring means, especially in the interior of the above-described incubation tank. In the case where aeration is applied, there is the method for example of inserting an air tube into the interior of the incubation tank from the upper opening of the incubation tank, positioning the front end of the air tube in the vicinity of the inner bottom part of the incubation tank, and generating bubbles. However, by providing a gas inlet at the bottom part of the incubation tank and connecting an air tube to the gas inlet from the exterior of the incubation tank, bubbles can be generated inside the incubation tank without introduction of an air tube into the interior of the incubation tank.

In the case where a gas inlet is provided at the bottom part of the above-described incubation tank, the abovementioned gas inlet is preferably provided inside a gas introduction part that extends laterally from the bottom part of the above-described incubation tank. In this case, it is preferable for a bent connector to be detachably attached to the tip of the gas introduction part.

The incubation device of this invention preferably has a suction holder, which is mounted to the outer surface of the device. In this case, a pair of supporting protrusions are preferably equipped at the sides of the abovementioned suction holder. In this case, the abovementioned supporting protrusions are preferably elastic protrusions that protrude in directions that are inclined with respect to the outer surface of the device and furthermore, the abovementioned pair of supporting protrusions are preferably inclined in mutually opposite directions with respect to the outer surface of the device.

PREFERRED EMBODIMENT(S) OF THE INVENTION

[First Embodiment]

Figure 1:
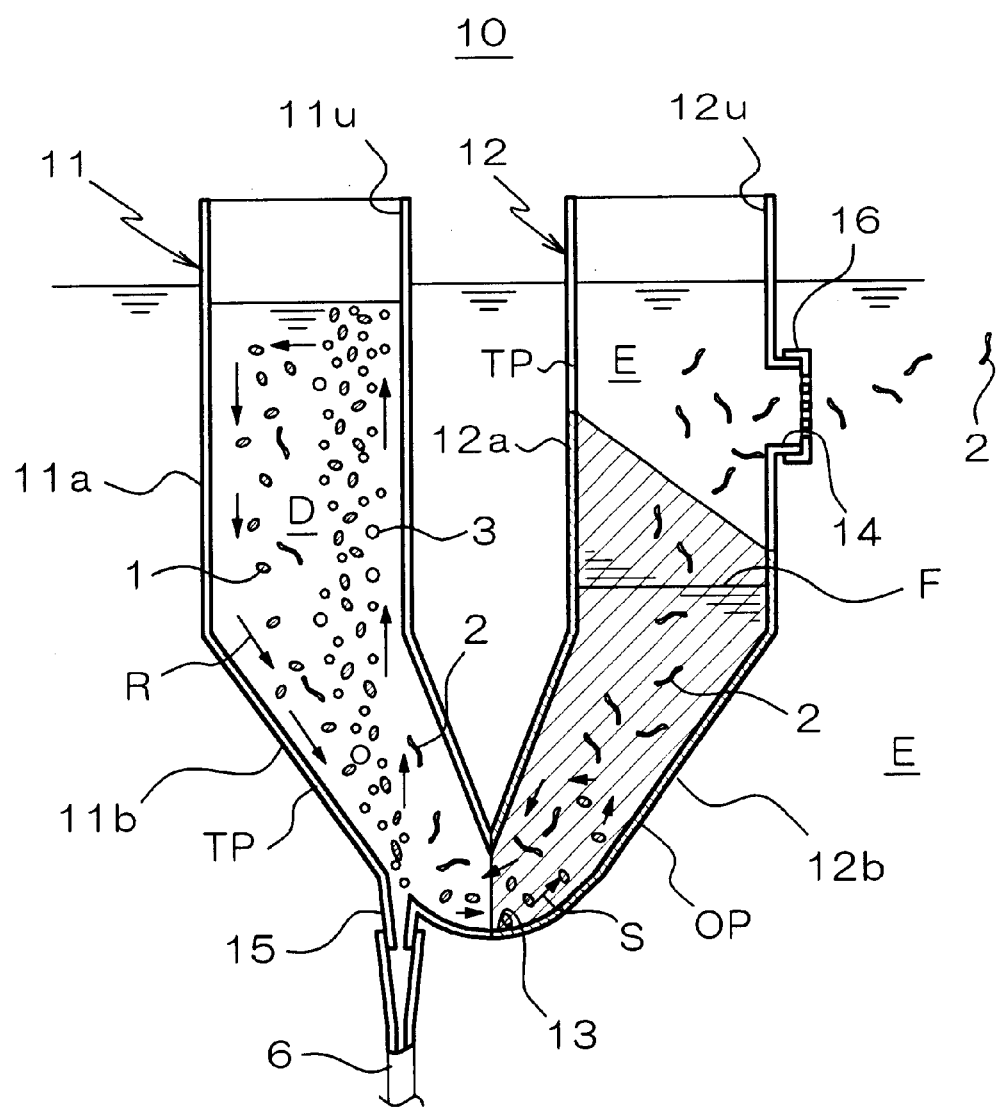
FIG. 1 is a sectional view, which shows a first embodiment of an aquatic animal incubation device by this invention.

FIG. 1 is a sectional view, which shows a first embodiment of an aquatic animal incubation device by this invention. This incubation device 10 is a container that has been integrally arranged from a synthetic resin, such as polyethylene terephthalate, polyester, acrylic resin, etc., and has a structure with which an incubation tank, equipped with an upper opening 11u, is connected at the lower most part with a separation tank 12, equipped with an upper opening 12u.

Incubation tank 11 has an upper housing part 11a, which is substantially fixed in the transverse cross-sectional shape in the vertical direction, and a lower housing part 11b, which gradually decreases in transverse cross-sectional area in the downward direction from the lower end of upper housing part 11 (in other words, gradually increases in transverse cross-sectional area in the upward direction from the lowermost part). Separation tank 12 also has an upper housing part 12a, which is substantially fixed in the transverse cross-sectional shape in the vertical direction, and a lower housing part 12b (corresponding to the abovementioned enlarged part), which gradually decreases in transverse cross-sectional area in the downward direction from the lower end of upper housing part 12 (in other words, gradually increases in transverse cross-sectional area in the upward direction from the lowermost part).

At the lowermost parts of incubation tank 11 and separation tank 12 is formed a communicating port 13 that puts both members in communication with each other. This communicating port 13 is arranged to be smaller in cross-sectional area than either of the lower housing part 11b of incubation tank 11 and lower housing part 12b of separation tank 12 that exist at the sides of the communicating port.

A side opening 14 is formed on a side wall of upper housing part 12a of separation tank 12, and a cap 16 is attached to this side opening 14. Cap 16 is arranged to engage with the open edge of side opening 14 and is equipped for example with a mesh, etc. to allow passage of water and brine shrimp larvae as shall be described below even in the attached condition.

A gas inlet 15 is formed at the bottom part of lower housing part 11b of incubation tank 11, and this gas inlet 15 is arranged to be connected with an air tube 6 as illustrated to enable the interior of incubation tank 11 to be aerated as shall be described below.

The entirety of incubation tank 11 is formed from a transparent material TP (for example, a transparent synthetic resin), and the upper half portion of upper housing part 12a of separation tank 12 is also formed from the transparent material TP. Meanwhile, the remaining lower half portion of upper housing part 12a of separation tank and the entirety of lower housing part 12b are formed from a light-shielding material OP, which is colored in black, brown, or other suitable color. This light-shielding material OP is arranged from an opaque or semitransparent material. Though a material that has been colored to shield light by absorbing at least part of the external light as has been mentioned above maybe used as a light-shielding material, a reflecting material that reflects external light may also be used. This reflecting material may be a semi-transmitting material or a half mirror.

With this embodiment's incubation device 10, which is arranged as described above, sea water, artificial sea water, or other salt water D is placed in incubation tank 11 and separation tank 12, and thereafter, freshwater E is poured gently into separation tank 12 or the entirety of incubation device 10 is sunken gently into an aquarium tank so that incubation device 10 will be positioned inside the freshwater E in the aquarium tank as shown in the Figure. Here, the upper openings 11u and 12u of incubation tank 11 and separation tank 12 are both positioned above the water surface and side opening 14 is immersed in water.

Here, by prior adjustment of the amount of salt water D, an interface F between salt water D and fresh water E is formed inside separation tank 12. This interface F will be maintained adequately over a period of a few days as long as there is little perturbation of the interior of separation tank 12. Since saltwater D is greater in specific gravity than water (freshwater) 5, saltwater D will be positioned below interface F inside separation tank 12 and freshwater E will be positioned above interface F. Also, only salt water D will be contained inside incubation tank 11.

In this condition, brine shrimp eggs 1 (for example, dried eggs) are loaded into incubation tank 11 and air is conveyed through air tube 6 to introduce bubbles 3 to the inner bottom part of incubation tank 11 from gas inlet 15. Since the bubbles 3 rise through salt water D inside incubation tank 11, a rising water current is generated and a circulating water current R (indicated in the Figure by arrows), which circulates in the vertical direction, is formed inside incubation tank 11.

By the eggs 1 in incubation tank 11 being thus stirred inside salt water D by the abovementioned circulating water current R, a good incubation environment is formed. Here, though a part of circulating water current R becomes a leaking water current S that enters into lower housing part 12b of separation tank 12 via communicating port 13 and a part of the eggs 1 becomes introduced into separation tank 12 in accompaniment with this leaking water current S, since the cross-sectional area of lower housing part 12b is greater than the cross-sectional area of communicating port 13 and since the interior of separation tank 12 is arranged to increase in cross-sectional area towards the upward direction (that is, since the abovementioned enlarged part is formed), the water current that has been introduced into lower housing part 12b of separation tank 12 weakens rapidly as it proceeds towards the upper part of lower housing part 12b. The interface F between salt water D and freshwater E is thus kept relatively still. Also, eggs 4 that have been introduced into lower housing part 12b sediment along the inclined inner bottom surface of lower housing part 12b and a large part thereof returns to lower housing part 11b of incubation tank 11 again via communicating port 13.

After the above-described good incubation environment has been maintained over a period of approximately one day, eggs 1 hatch gradually, giving rise to brine shrimp larvae 2. The larvae 2 are moved by the above-described circulating water current R and leaking water current S and move on their own as well. A part of the larvae 2 are moved by the abovementioned leaking water current S or move on their own into lower housing part 12b of separation tank 12 via communicating port 13. For the larvae 2 that have moved into lower housing part 12b, illumination of external light will be restricted by the shielding of light by the above-described light-shielding material OP. Since brine shrimp larvae 2 generally have the characteristic of moving towards light, the larvae 2 that have moved inside lower housing part 12b move towards the region, provided at the upper part of separation tank 12, that is surrounded by transparent material TP and into which external light enters. Larvae 2 eventually reaches upper housing part 12a of separation tank 12 and part thereof swims to the outer side of incubation device 10 from side opening 14 and through cap 16.

With the present embodiment, most of the egg shells and unhatched eggs stay in incubation tank 11 and only a very small part of the egg shells and unhatched eggs become introduced into the vicinity of the bottom part of lower housing part 12b of separation tank 12. The eggshells that have become introduced into separation tank 12 float to the water surface of separation tank 12 and the unhatched eggs return towards communicating port 13 along the inclination of lower housing part 12b. In particular, though the egg shells are light and thus float through the interior of separation tank 12, since the lower housing part 12b of separation tank 12 is inclined towards side opening 14 as a whole, the floating egg shells rise towards upper opening 12u through horizontal positions located away from side opening 14 and hardly any of the egg shells move out to the exterior from side opening 14. Since only the hatched brine shrimp larvae 2 thus swim towards the light and out to the exterior from side opening 14, the interior of the aquarium tank will hardly be polluted and the work of taking out larvae 2 from inside the incubation tank and putting them into the aquarium tank is also made unnecessary.

Also, though salt water D is contained inside incubation device 10, since interface F is positioned inside separation tank 12, the leakage of salt water D into the aquarium tank is prevented. Also with incubation device 10, since incubation tank 11 and separation tank 12 are put into communication with each other via communicating port 13 with a relatively narrow opening area and the influence of the water current inside incubation tank 11 is thus prevented from being transmitted readily into separation tank 12, the mixing of salt water D and freshwater E can be restrained. Separation tank 12 thus has the function of separating larvae 2 from egg shells and unhatched eggs and the function of separating salt water D from freshwater E.

With the present embodiment, since incubation tank 11 is arranged from transparent material TP, it provides the advantage that the degree of stirring of eggs 1, the hatching conditions of eggs 1, the conditions of egg shells and unhatched eggs, etc. can be ascertained readily from the exterior.

[Second Embodiment]

Figure 2:
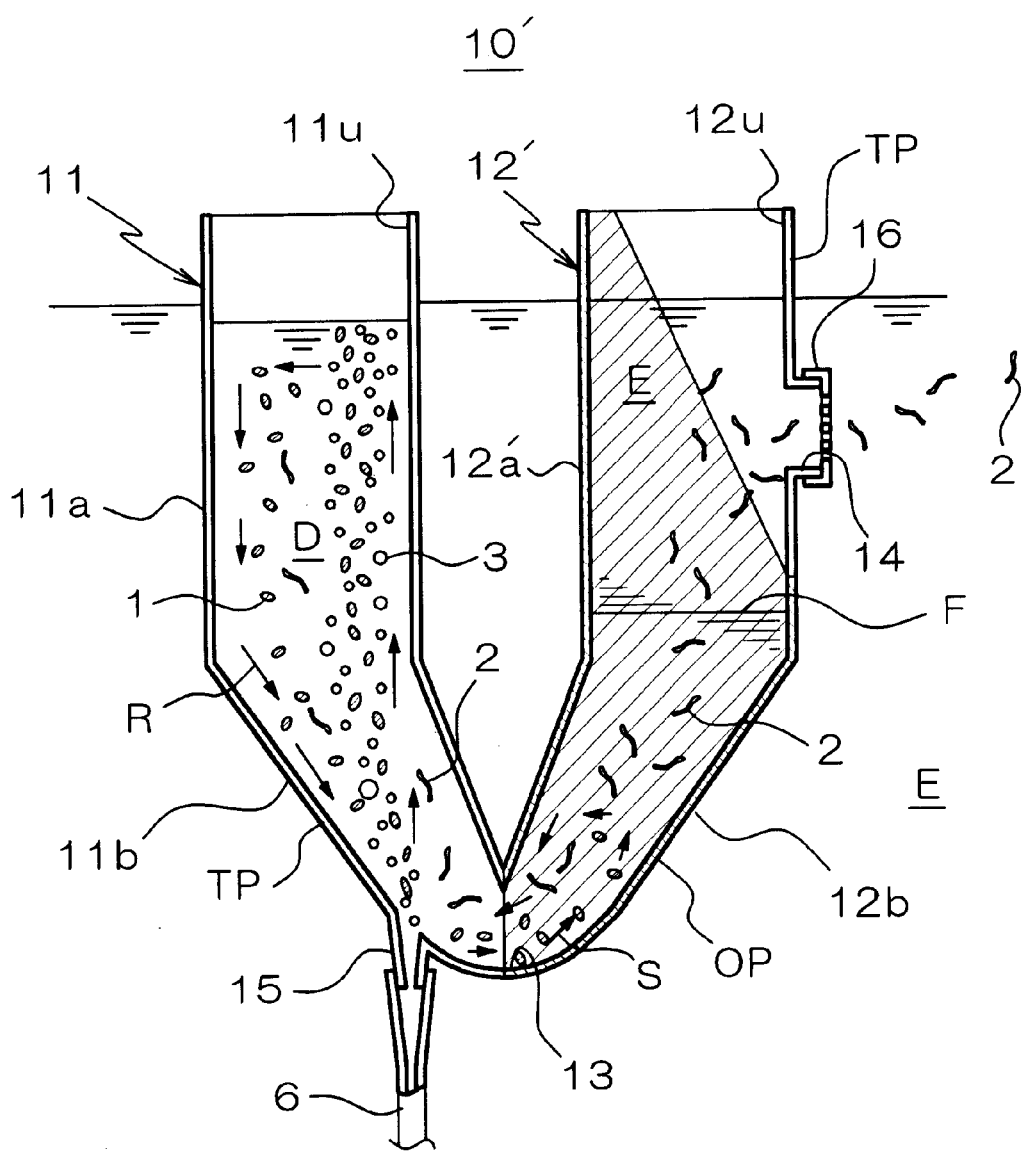
FIG. 2 is a sectional view, which shows a second embodiment of an aquatic animal incubation device by this invention.

An incubation device 10' of a second embodiment of this invention shall now be described with reference to FIG. 2. With incubation device 10' of this embodiment, the parts that are the same as those of the first embodiment are provided with the same symbols and descriptions thereof shall be omitted.

As with the first embodiment, with incubation device 10', the entirety of lower housing part 12b of separation tank 12' is arranged from a light-shielding material OP, a part of upper housing part 12a' is arranged from light-shielding material OP, and the remaining part of upper housing part 12a' is arranged from a transparent material TP. However, this embodiment differs from the above-described first embodiment in that the part of upper housing part 12a' that is arranged from light-shielding material OP extends to the open edge of upper opening 12u at the side opposite the side opening 14 (the left side in the Figure). On the other hand, at the side at which side opening 14 is formed (the right side in the Figure), there exists a region that is formed from transparent material TP and extends slightly below the side opening 14 as in the above-described first embodiment.

With incubation device 10' of this embodiment, since the part of separation tank 12 that is formed from light-shielding material OP extends to the open edge of upper opening 12u, larvae 2 are readily induced to move towards side opening 14 and movement of larvae 2 into the aquarium tank via side opening 14 can thus be induced more efficiently. For example, whereas with the incubation device 10 of the first embodiment, a part of larvae 2 may reside in the vicinity of the water surface of separation tank 12 (due to being induced by the external light that enters from upper opening 12u), the possibility of this happening is reduced with the present embodiment and larvae 2 are enabled to swim out from side opening 14 at a higher probability.

[Third Embodiment]

Figure 3:
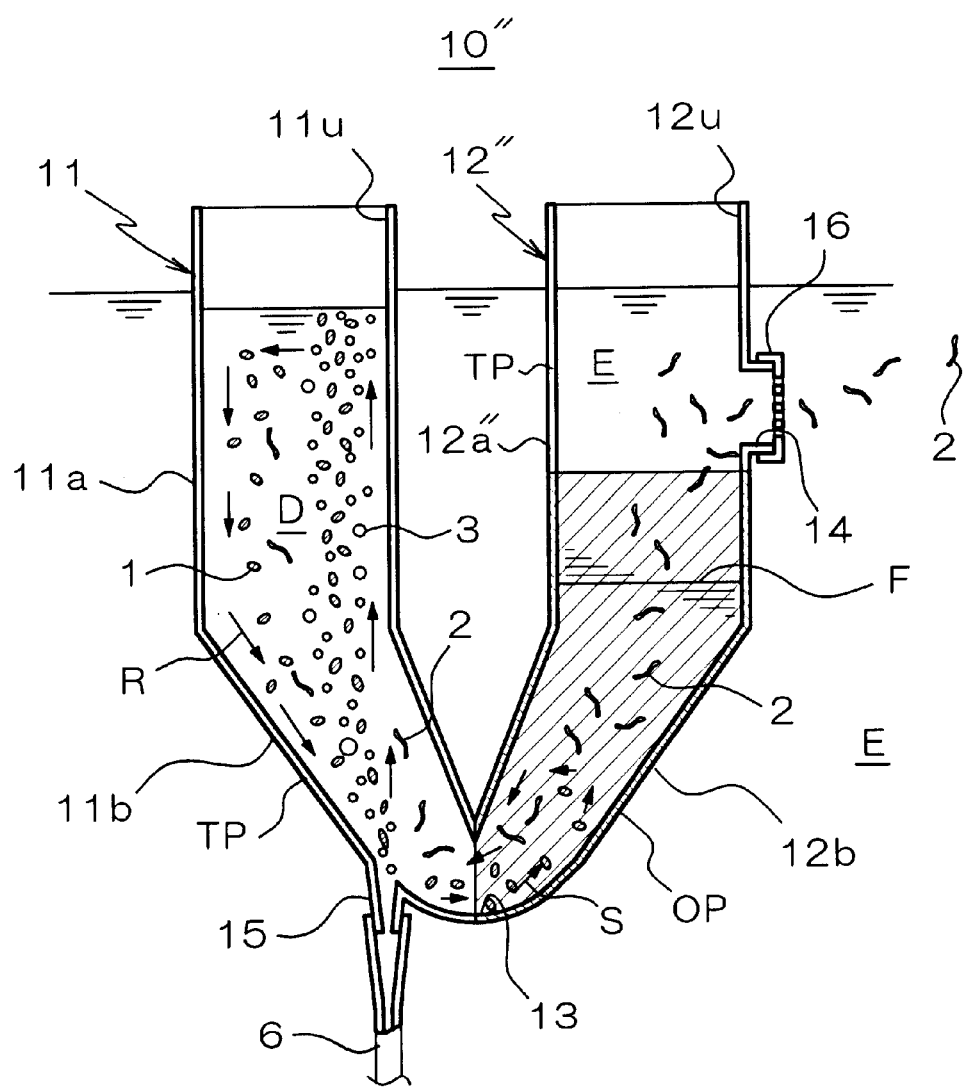
FIG. 3 is a sectional view, which shows a third embodiment of an aquatic animal incubation device by this invention.

An incubation device 10" of a third embodiment of this invention shall now be described with reference to FIG. 3. With incubation device 10" of this embodiment, the parts that are the same as those of the first embodiment are provided with the same symbols and descriptions thereof shall be omitted.

As with the first and second embodiments, with incubation device 10", the entirety of lower housing part 12b (enlarged part) of separation tank 12" is arranged from a light-shielding material OP, a part of upper housing part 12a" is arranged from light-shielding material OP, and the remaining part of upper housing part 12a" is arranged from a transparent material TP. However, this embodiment differs from the above-described first embodiment and second embodiment in that the upper end (outer edge) of the region of upper housing part 12a" that is arranged from light-shielding material OP is made substantially horizontal below side opening 14.

As has been mentioned above, with the present embodiment, a part arranged from transparent material TP is not provided in a manner biased towards the side of side opening 14 (the right side of the Figure) and the part arranged from light-shielding material OP is not provided in a manner biased towards the side opposite side opening 14 (the left side of the Figure) different from the first embodiment and the second embodiment, and the lower part of separation tank 12 that is made from light-shielding material OP and the upper part of separation tank 12" that is made from transparent material TP are thus arranged so that the boundary line between them extend substantially horizontally. Even with this arrangement, it has been confirmed that the larvae 2 that have moved into lower housing part 12b" of separation tank 12" move towards the upper housing part 12a and eventually swim out from the interior of separation tank 12" to the exterior via side opening 14.

In the case where light-shielding material OP, which is the abovementioned light-shielding means, is not provided, since larvae 2 have the characteristic of staying in the salt water D region in the vicinity of interface F and are less likely to move beyond interface F and into freshwater E, larvae 2 cannot be induced to move to the exterior via side opening 14. However, with the present embodiment, since the region that is shielded from light extends beyond and above the interface F (and to the side opening 14 side), larvae 2 swim beyond interface F and towards the region where external light enters. Since it is normally preferable, in terms of keeping interface F still and restraining the mixing of salt water D and freshwater E, to position interface F inside the upper housing part 12a" at which the cross-sectional has been increased, it is preferable that the light-shielded region be extended beyond the lower housing part 12b, which is gradually increased in cross-sectional area, and into a part of the upper housing part 12a".

[Fourth Embodiment]

Figure 4:
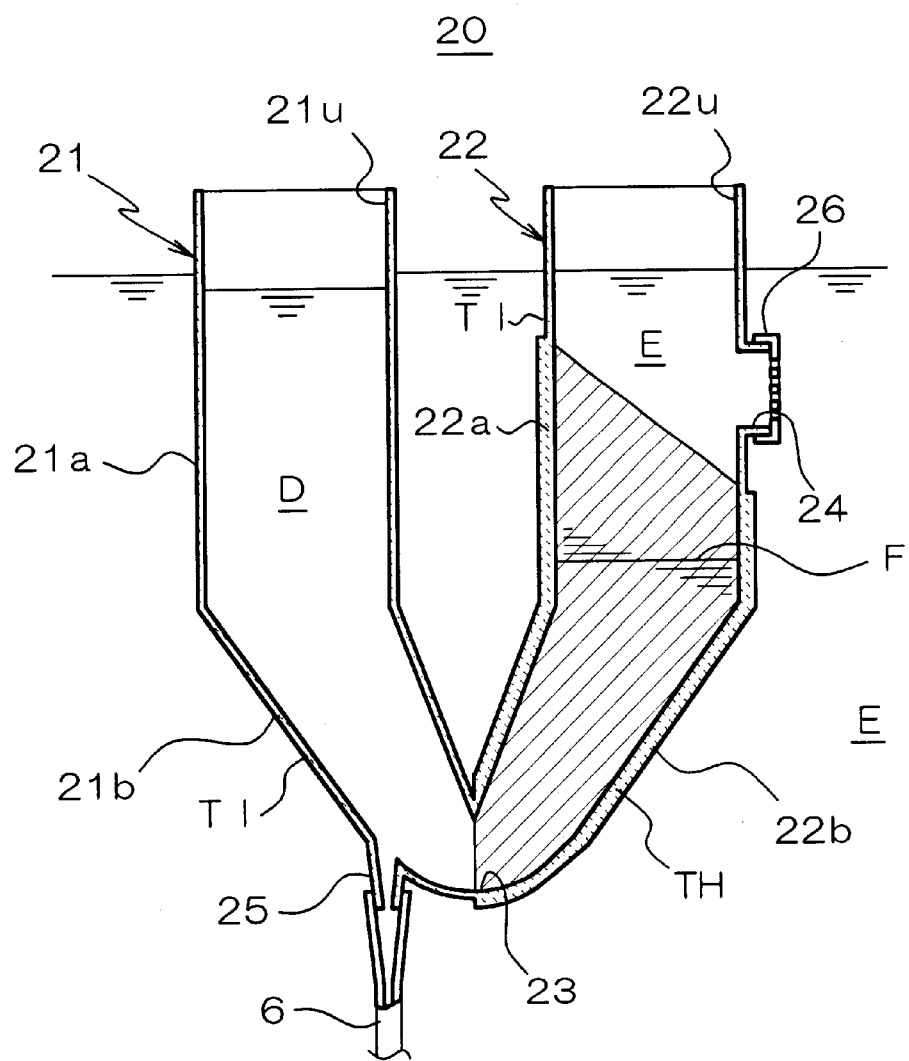
FIG. 4 is a sectional view, which shows a fourth embodiment of an aquatic animal incubation device by this invention.

Next, incubation device 20 of a fourth embodiment of this invention shall be described with reference to FIG. 4. Incubation device 20 of this embodiment is equipped with incubation tank 21, upper opening 21u, upper housing part 21a, lower housing part 21b, separation tank 22, upper opening 22u, upper housing part 22a, lower housing part 22b, communicating port 23, side opening 24, gas inlet 25, and cap 26, and since these are substantially the same as those of the first embodiment, descriptions concerning the same matters shall be omitted.

The present embodiment differs from the above-described first to third embodiments in that the material that makes up incubation tank 21 and separation tank 22 is colored and has a weak light-shielding property as a whole. Also, the wall of a region, comprised of a part of the upper housing part 22a of separation tank 22 and the entirety of lower housing part 22a, is formed to be thicker than the walls of other parts and this region is thus arranged to be higher in light-shielding property than the other parts. That is, the entirety of incubation tank 21 is arranged from a thin wall TI, the abovementioned region of separation tank 22 is arranged from a thick wall TH, and the parts of separation tank 22 besides the abovementioned region (the remaining part of upper housing part 22a) is arranged from thin wall TI.

Since the part at which thick wall TH is formed is higher in light-shielding property than the parts at which thin wall TI is formed, this embodiment can provide the effect of inducing brine shrimp larvae to move into freshwater E and then to the exterior of separation tank 22 in the manner described above. Here, the process of joining a light-shielding material with a transparent material in the manufacture of incubation device 20 is made unnecessary, and since incubation device 20 can be manufactured by integral forming using a uniform material, the manufacturing cost can be reduced.

With the present embodiment, the range in which thick wall TH is formed may be the same as that of any of the first to third embodiments. Also, by forming the surface (outer surface or inner surface) of thick part TH as a rough surface, the light-shielding property of thick part TH can be increased further.

[Fifth Embodiment]

Figure 5:
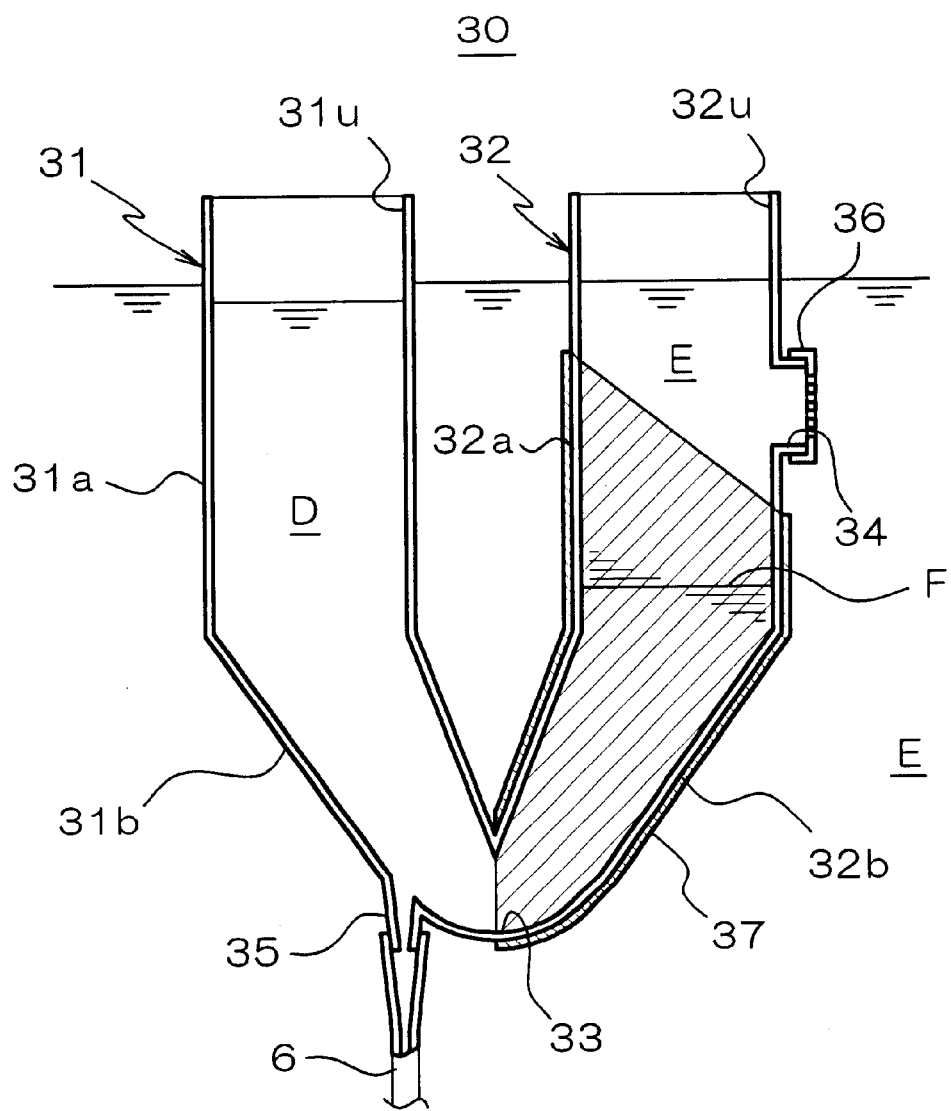
FIG. 5 is a sectional view, which shows a fifth embodiment of an aquatic animal incubation device by this invention.

Next, incubation device 30 of a fifth embodiment of this invention shall be described with reference to FIG. 5. Incubation device 30 of this embodiment is equipped with incubation tank 31, upper opening 31u, upper housing part 31a, lower housing part 31b, separation tank 32, upper opening 32u, upper housing part 32a, lower housing part 32b, communicating port 33, side opening 34, gas inlet 35, and cap 36, and since these are substantially the same as those of the first embodiment, descriptions concerning the same matters shall be omitted.

With this incubation device 30, the entirety of incubation tank 31 and separation tank 32 is formed from a transparent material, and a light-shielding layer 37 is arranged to cover a part of the upper housing part 32a of separation tank 32 and the entirety of lower housing part 32b. This light-shielding layer 37 may be a colored layer or a reflecting layer that covers the surface of the material that comprises separation tank 32 or may be a light-shielding plate (light-shielding film, etc.) that has been fitted onto the surface of separation tank 32 so as to cover the surface.

With the present embodiment, the range in which light-shielding layer 37 covers separation tank 32 may be the same as that of any of the first to fourth embodiments.

[Sixth Embodiment]

Figure 6:
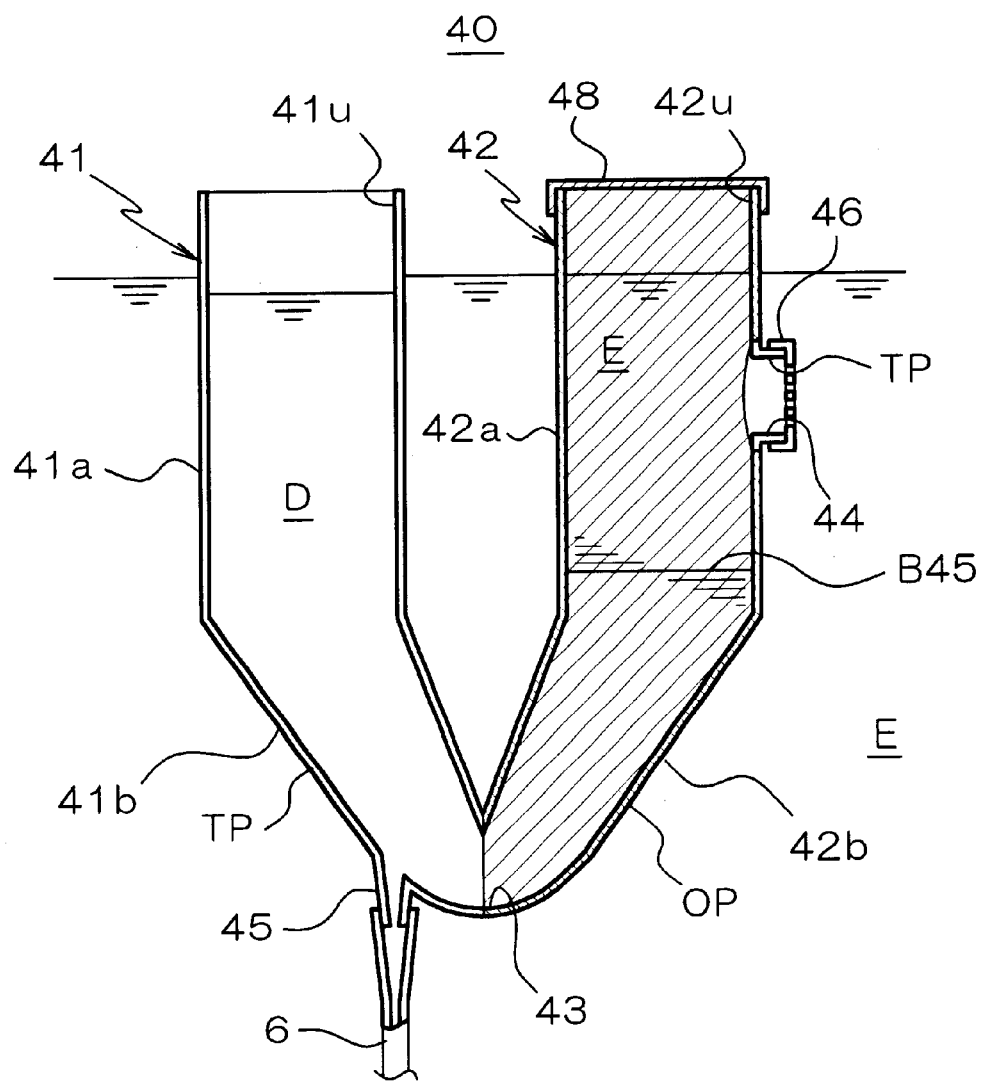
FIG. 6 is a sectional view, which shows a sixth embodiment of an aquatic animal incubation device by this invention.

Next, incubation device 40 of a sixth embodiment of this invention shall be described with reference to FIG. 6. Incubation device 40 of this embodiment is equipped with incubation tank 41, upper opening 41u, upper housing part 41a, lower housing part 41b, separation tank 42, upper opening 42u, upper housing part 42a, lower housing part 42b, communicating port 43, side opening 44, gas inlet 45, and cap 46, and since these are substantially the same as those of the first embodiment, descriptions concerning the same parts shall be omitted.

Incubation device 40 of this embodiment differs from the first embodiment in that nearly all of separation tank 42, with the exception of the open edge of side opening 44, is formed from a light-shielding material OP. Here, in place of forming with light-shielding material OP, a light-shielding property may be provided by a thick wall as in the fourth embodiment or a light-shielding property may be provided by a light-shielding layer as in the fifth embodiment. Also with the present embodiment, the upper opening 42u of separation tank 42 is arranged to be covered by a light-shielding lid 48.

With this embodiment, light-shielding material OP and lid 48 prevent external light from entering readily into separation tank 42 except at side opening 44 and the open edge thereof. The brine shrimp larvae that have moved into separation tank 42 will thus proceed only towards side opening 44 and the open edge thereof and the larvae can thus be made to swim out to the exterior via side opening 44 more efficiently.

[Seventh Embodiment]

Figure 7:
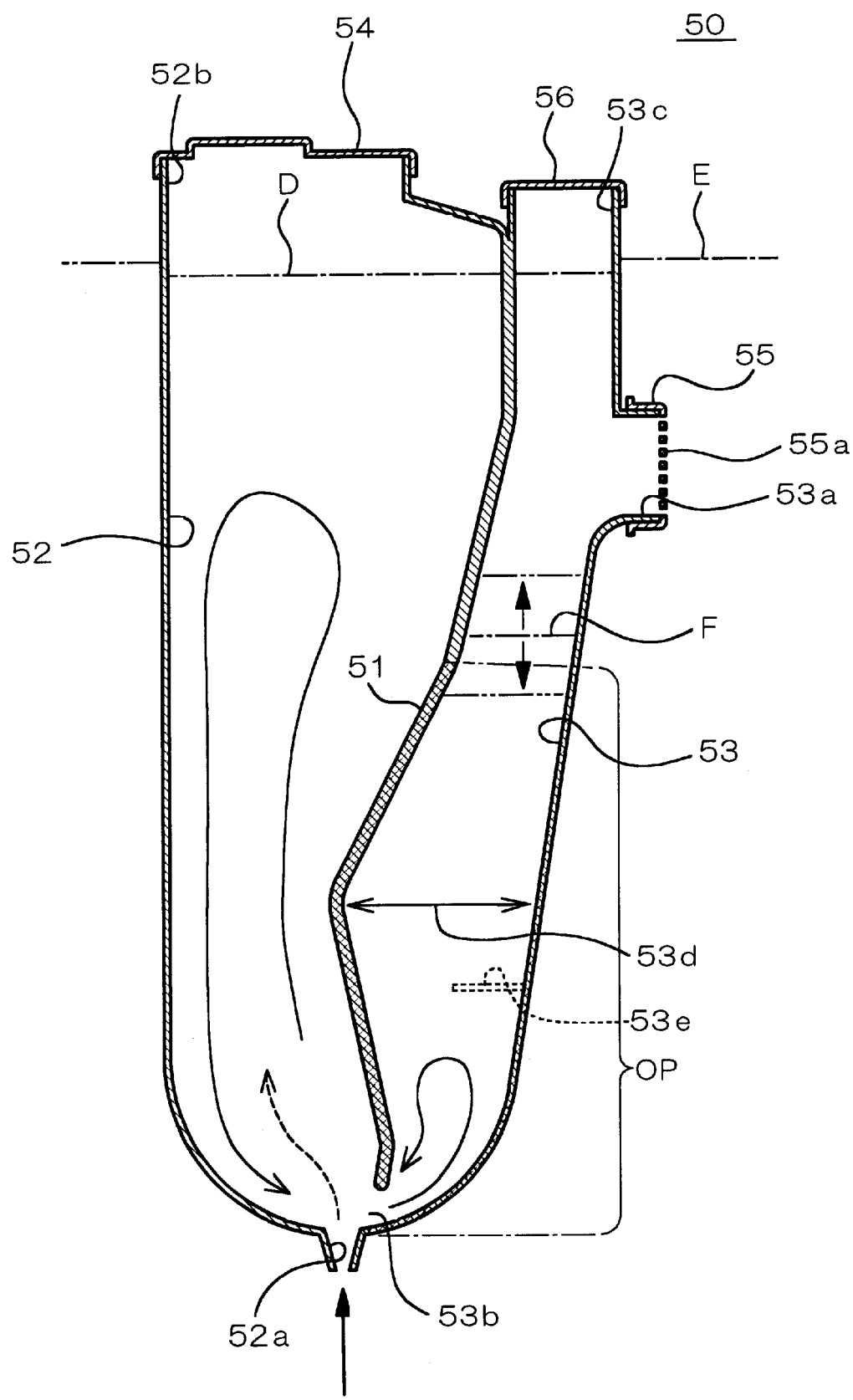
FIG. 7 is a sectional view, which shows a seventh embodiment of an aquatic animal incubation device by this invention.
Figure 8:
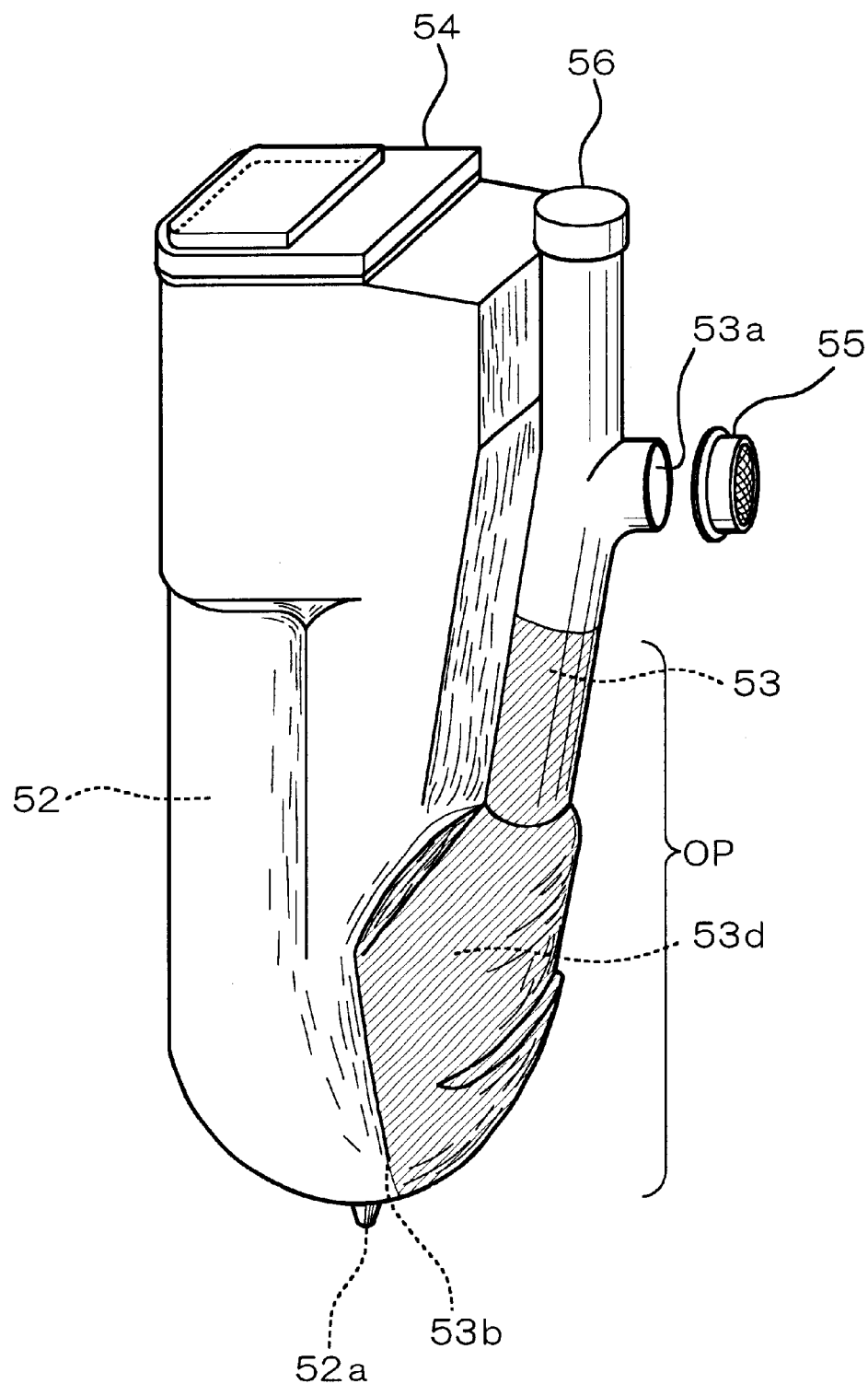
FIG. 8 is a perspective view, which shows the external appearance of the seventh embodiment.

An incubation device 50 of a seventh embodiment of this invention shall now be described with reference to FIG. 7 and FIG. 8.

The entirety of this incubation device 50 is formed integrally by blow molding of a transparent resin material. Incubation device 50 is provided with an incubation tank 52 and a separation tank 53, which are partitioned by a partitioning wall 51. A gas inlet 52a is formed at the bottom part of incubation tank 52 and an upper opening 52b is formed at the upper part. Upper opening 52b is closed by an upper lid 54. Separation tank 53 is provided with a side opening 53a, which is opened to the side, a communicating port 53b, which puts separation tank 53 in communication with incubation tank 52, and an upper opening 53c, which is opened at the upper end part of separation tank 53. A mesh cap 55, equipped with a mesh 55a, is mounted onto side opening 53a and mesh 55a is arranged to cover side opening 53a. Upper opening 53c is closed by an upper lid 56.

Whereas the outer wall of incubation device 50 is basically arranged from a transparent or light-transmitting material, the lower part of the outer wall of separation tank 53 and the lower part of the abovementioned partitioning wall 51 is formed from a semitransparent or opaque (for example, a black or brown colored) light-shielding material. Needless to say, in place of using a light-shielding material, the wall may be thickened in part or the wall may be covered with a light-shielding layer, etc. as has been described above.

With this embodiment, since separation tank 53 is put into communication with incubation tank 52 via communicating port 53b, which opens to the lower part of incubation tank 52, and since separation tank 53 is formed so as to extend upward along the outer wall of incubation tank 52 directly from communicating port 53b, separation tank 53 can be made large in vertical height, thus enabling the allowable range of fluctuation of the interface F that is formed between saltwater D and freshwater E to be expanded and incubation device 50 to be arranged compactly as a whole. Also, since upper opening 53c is formed at the upper end part of separation tank 53, the egg shells that remain after hatching of the brine shrimp can be made to float to the water surface at the inner side of upper opening 53c and these egg shells can be removed whenever necessary. This eggshell removal work can be performed without raising incubation device 50 from inside freshwater E. The cleaning interval of incubation device 50 can thus be reduced.

With incubation device 50, since an enlarged part 53*d*, which is greatly enlarged in the horizontal cross section, is formed at the lower part of separation tank 53, the velocity of entry of unhatched eggs, which ride the circulating water current, resulting from the supply of air from gas inlet 52*a*, and enter into separation tank 53, can be attenuated and the unhatched eggs can be returned smoothly into incubation tank 52 along the inner wall face that is inclined downward towards gas inlet 52*a*. In this case, a restraining plate 53*e*, for retraining the rising of unhatched eggs, may be provided at the vicinity of enlarged part 53*d* as indicated by the dotted line in the Figure.

[Eighth Embodiment]

Figure 9:
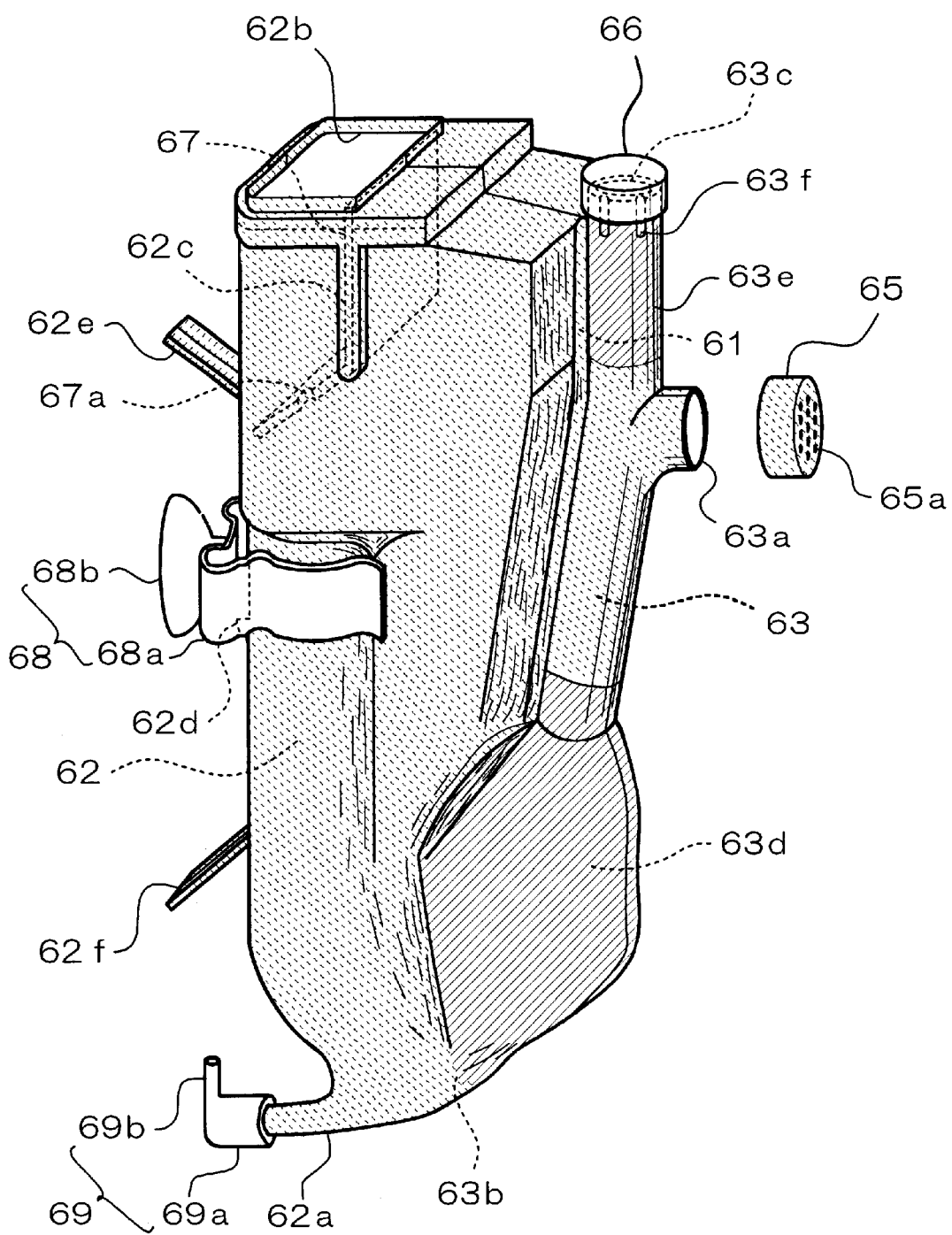
FIG. 9 is a perspective view, which shows the external appearance of an eighth embodiment of an aquatic animal incubation device by this invention.

Lastly, an incubation device 60 of an eighth embodiment of this invention shall be described in detail with reference to FIG. 9. This incubation device 60 is arranged by mutually adhering together a pair of half-parts made from a semitransparent resin, such as a thinly colored acrylic resin, etc. A black-colored or dark-colored (brown-colored, etc.) resin is preferable as the semitransparent resin.

Incubation device 60 is provided with an incubation tank 62 and a separation tank 63, which are partitioned from each other by a partitioning wall 61. A gas introduction part 62*a*, which is arranged so as to extend to the side of the device, is formed at the bottom part of incubation tank 62, and an upper opening 62*b* is formed at the upper part. A pair of opposing vertical grooves 62*c*, which extend downwards, are formed on the inner surface of the wall in the vicinity of upper opening 62*b*, and a water current restraining plate 67 is inserted from upper opening 62*b* so that the sides of this water current restraining plate 67 engage with vertical grooves 62*c*. In the illustrated example, water current restraining plate 67 is arranged from a plate-like material with a bent shape. This water current restraining plate 67 is positioned so as to partition an inner space at the vicinity of upper opening 62*b* of incubation tank 62 from an inner space besides this inner space. Water current restraining plate 67 is preferably provided with an opening 67*a* for enabling the entry and exit of water as suitable. Though this opening 67*a* is arranged to have a notch-like shape notched from the side part in the illustrated example, it may be a hole instead. Water current restraining plate 67 restrains the water current that is generated inside incubation tank 62 by the introduction of air from gas introduction part 62*a* so that when dried eggs of brine shrimp are loaded from upper opening 62*b*, the dried eggs won't become caught by the water current until they absorb water and become heavy. Such an arrangement is made since when dried eggs prior to absorption of water are caught by the abovementioned water current, they may enter as they are from incubation tank 62 into separation tank 63 via the communicating port, float through the interior of separation tank 63, and dried eggs may thus accumulate in the floating condition at the water surface of separation tank 63. Eggs that have absorbed water and have become heavy at the inner side of water current blocking plate 67 sediment gradually towards the lower part of incubation tank 62 via the gaps between water current blocking plate 67 and the inner face of incubation tank 62 and via the abovementioned opening 67*a* and become stirred by the abovementioned water current.

An engaging protrusion 62*d* is provided in the vicinity of the central part in the height direction of the outer face of incubation tank 62, and this engaging protrusion 62*d* is arranged to be engaged with a suction holder 68, which is illustrated in the Figure. Suction holder 68 is equipped with a fitting member 68*a*, which fits onto the outer face of incubation tank 62, and a suction pad 68*b*, which is attached to this fitting member 68*a*. Suction pad 68*b* is attached by suction to the inner face of an aquarium tank, for example, by being pressed against the inner face of the aquarium tank and thus enables the fixing of incubation tank 60 inside the aquarium tank. Also, above and below the abovementioned engaging protrusion 62*d* of incubation tank 62 are provided elastic supporting protrusions 62*e* and 62*f*, which protrude in an inclined manner from the outer face. By the tips of these supporting protrusions 62*e* and 62*f* coming into contact with the inner face of the aquarium tank, incubation tank 60, which has been fixed via the above-described suction holder 68 to the inner face of the aquarium tank, is prevented from rotating upwards or downwards about suction holder 68 and the orientation of incubation device 60 is thereby stabilized. Here, since supporting protrusions 62*e* and 62*f* are inclined with respect to the outer face of incubation tank 62 and readily undergo elastic deformation upon contacting the inner face of the aquarium tank, they will not hamper the suction process and suction pad can thus be made to be attached by suction onto the inner face of the aquarium tank readily. This operation will thus not be hampered readily. In the illustrated example, since the pair of supporting protrusions 62*e* and 62*f* that are provided above and below the suction pad are inclined in mutually opposite directions, when suction pad 68*b* is pressed against the inner face of the aquarium tank, the downward or upward shifting of the suction attachment position of suction pad 68*b* can be avoided even when the supporting protrusions contact the inner face of the aquarium tank.

At the bottom part of incubation tank 62, a connector 69 is fitted onto the tip of gas introduction part 62*a*, which extends towards side of incubation tank 62. Connector 69 is equipped with a large-diameter connection part 69*a*, which is fitted to gas introduction part 62*a*, and a small-diameter connection part 69*b*, which is bent with respect to large-diameter connection part 69*a*, extends upwards, and is smaller in diameter than large-diameter connection part 69*a*. An unillustrated air tube is connected to this small-diameter connection part 69*b*. Since such a gas introduction part 62*a* is extended towards the side of incubation tank 62 and a connector 69, having a bent shape at the tip, is connected, failure of introduction of air due to bending of the unillustrated air tube can be prevented. Also, since connector 69 is arranged to be detachable with respect to gas introduction part 62*a*, internal cleaning of gas introduction part 62*a* and connector 69 can be performed readily.

Separation tank 63 is provided with a side opening 63*a*, which is opened towards the side, a communicating port 63*b*, which is in communication with incubation tank 62, and an upper opening 63*c*, which is opened at the upper end part of separation tank 63. A cap 65, equipped with a plurality of small holes 65*a*, is mounted to side opening 63*a* so as to cover side opening 63*a* and enable the flow of water and passage of brine shrimp larvae through small holes 65*a* but prevent passage of the aquarium fish, etc. in the aquarium tank. Cap 65 is preferably made of the same semitransparent material as the main body of the device. Since small holes 65*a* are formed in this cap 65, a water current in the aquarium tank will be less likely to enter into separation tank 63, and as a result, in the case where sea water or salt water is introduced inside the incubation device, the effect that the interface between the sea water or salt water and the freshwater in the aquarium tank can be kept still is provided.

Upper opening 63c is closed by an upper lid 66. A groove 63f is formed on the outer surface of the opening edge part of upper opening 63c. Passage of air between the interior of separation tank 63 and the exterior is secured by this groove 63f even when upper lid 66 is attached. Upper lid 66 is preferably made of a light-shielding material.

At the lower part of separation tank 63 is provided an enlarged part 63d, which is arranged to have a larger horizontal cross section than the other parts so that when a water current enters into separation tank 63 from communicating port 63b, the flow cross section for the water current will increase suddenly. At enlarged part 63d and a part that enters slightly into the cylindrical part disposed above enlarged part 63d, the wall is formed to be greater in thickness than the other parts, and as a result, external light is made less likely to enter into these parts. Also, the outer surfaces of these parts are made rough surfaces on which indentations and protrusions are formed and since external light is scattered at the outer surface by this rough surface, external light is made even less likely to enter inside.

The wall of the upper part of separation tank 63, that is, the part that exists above side opening 63a is formed to be thicker than the wall in the vicinity of side opening 63a, and as a result external light is made less likely enter into the interior at this part. The outer surface of this part that exists above side opening 63a may also be made a rough surface in the same manner as described above.

With the present embodiment, since the entire main body of the device is formed from a colored, semitransparent material and is made higher in light-shielding property in parts by thickening and roughening of the surface, it provides such effects as being easy to manufacture and enabling manufacturing costs to be reduced, especially in the case where a synthetic resin material is used.

INDUSTRIAL APPLICABILITY

The above-described invention is extremely useful as a device for incubating aquatic animals, such as brine shrimp (Artemia), whose larvae that hatch from eggs have the characteristic of moving towards light.

What is claimed is:

1. An incubation device for incubation of an aquatic animal, comprising an incubation tank, for hatching the eggs of the aquatic animal, a separation tank, for separating the aquatic animal, and a communicating port, which puts said incubation tank and said separation tank in communication with each other, and being characterized in having, at a region of said separation tank at the side of said communicating port, a light-shielding wall part that is provided with a higher light-shielding property than the other parts of said separation tank.

2. An incubation device as set forth in claim 1, wherein said separation tank is provided with a side opening that is formed on a side face of said separation tank.

3. An incubation device as set forth in claim 2, wherein said light-shielding wall part is arranged to extend over a wider range in the direction away from said communicating port at the side opposite said side opening than at the side of said side opening.

4. An incubation device as set forth in claim 2, wherein said light-shielding wall part is also provided above said side opening.

5. An incubation device as set forth in any of claim 1 through claim 4, wherein said incubation tank and said separation tank are formed integrally from a colored, semi-transparent material, said light-shielding wall part is formed to be thicker than the other wall parts.

6. An incubation device as set-forth in claim 5, wherein the surface of said light-shielding wall part is made a rough surface.

7. An incubation device as set forth in claim 1, wherein said separation tank is provided with an enlarged part, which increases gradually in cross-sectional area with the distance away from said communicating port.

8. An incubation device as set forth in claim 7, wherein said light-shielding wall part is arranged to cover the entirety of said enlarged part and to extend beyond the outer edge of said enlarged part in the direction away from said communicating port.

9. An incubation device as set forth in claim 1, wherein said communicating port is provided at the lowermost parts of said incubation tank and said separation tank.

10. An incubation device as set forth in claim 9, wherein said separation tank has an inner bottom surface that is gradually inclined upwards from said communicating port.

11. An incubation device as set forth in claim 10, wherein said light-shielding wall part is arranged to cover the entirety of a portion having said inclined inner bottom surface and to extend upwards and beyond the upper edge of said portion.

12. An incubation device as set forth in claim 1, wherein an upper opening is provided at the upper part of said separation tank.

13. An incubation device as set forth in claim 12, wherein a light-shielding lid is attached to the upper opening of said separation tank.

14. An incubation device as set forth in claim 12, wherein said light-shielding wall part is also provided at a part extending from said side opening to said upper opening of said separation tank.

15. An incubation device as set forth in claim 1, wherein an upper opening is provided at the upper part of said incubation tank.

16. An incubation device as set forth in claim 15, wherein a water current restraining plate, which restrains the flow of water in and out of the vicinity of said upper opening inside said incubation tank, is inserted in said upper opening.

17. An incubation device as set forth in claim 1, wherein the wall of said incubation tank has a light-transmitting property.

18. An incubation device as set forth in claim 1, wherein a gas inlet is provided at the bottom part of said incubation tank.

19. An incubation device as set forth in claim 18, wherein said gas inlet is provided inside a gas introduction part that extends from the bottom to the side of said incubation tank.

20. An incubation device as set forth in claim 19, wherein a bent connector is detachably attached to the tip of said gas introduction part.

21. An incubation device as set forth in claim 1, having a suction holder that is mounted to the outer surface of the device.

22. An incubation device as set forth in claim 21, wherein a pair of supporting protrusions is provided at the sides of said suction holder.

23. An incubation device as set forth in claim 22, wherein said supporting protrusions are elastic protrusions that protrude in an inclined direction with respect to the outer surface of the device.

24. An incubation device as set forth in claim 23, wherein said pair of supporting protrusions are inclined in mutually opposite directions with respect to the outer surface of the device.

* * * * *